United States Patent
Perets et al.

(10) Patent No.: US 6,564,316 B1
(45) Date of Patent: May 13, 2003

(54) METHOD AND APPARATUS FOR REDUCING CODE SIZE BY EXECUTING NO OPERATION INSTRUCTIONS THAT ARE NOT EXPLICITLY INCLUDED IN CODE USING PROGRAMMABLE DELAY SLOTS

(75) Inventors: Ronen Perets, Herzlia (IL); Bat-Sheva Ovadia, Hod Hasharon (IL); Yael Gross, Ramat Gan (IL); Eran Briman, Kiriat Ono (IL); Rakefet Freedman, Raanana (IL)

(73) Assignee: Parthusceva Ltd., Herzlia (IL)

( * ) Notice: Subject to any disclaimer, the term of this patent is extended or adjusted under 35 U.S.C. 154(b) by 0 days.

(21) Appl. No.: 09/392,641

(22) Filed: Sep. 9, 1999

Related U.S. Application Data

(60) Provisional application No. 60/099,701, filed on Sep. 10, 1998.

(51) Int. Cl.[7] .............................. G06F 9/30; G06F 9/40; G06F 9/38
(52) U.S. Cl. ...................... 712/219; 712/226; 712/219; 712/245
(58) Field of Search ................................. 712/219, 235, 712/227, 217, 218, 216, 226, 207, 245, 233; 711/125, 137, 140, 169

(56) References Cited

U.S. PATENT DOCUMENTS

| | | | | |
|---|---|---|---|---|
| 4,773,002 A | * | 9/1988 | Iwasaki et al. | 712/226 |
| 5,958,044 A | * | 9/1999 | Brown et al. | 712/219 |
| 6,157,988 A | * | 12/2000 | Dowling | 712/207 |
| 6,275,921 B1 | * | 8/2001 | Iwata et al. | 712/24 |
| 6,275,929 B1 | * | 8/2001 | Blum et al. | 712/219 |

FOREIGN PATENT DOCUMENTS

| | | | | |
|---|---|---|---|---|
| JP | 06-131180 | * | 5/1994 | G06F/9/38 |
| JP | 07-093151 | * | 4/1995 | G06F/9/38 |

* cited by examiner

*Primary Examiner*—Thomas Lee
*Assistant Examiner*—James K. Trujillo
(74) *Attorney, Agent, or Firm*—Eitan, Pearl, Latzer & Cohen Zedek, LLP.

(57) ABSTRACT

There is disclosed a state machine made up of a delay slot path and a no operation path, both made up of nodes with arcs connecting between them. There are arcs between the nodes of the delay slot path and the nodes of the no operation path. The number of nodes in the no operation path is equivalent to the number of available delay slots. The path taken for a specific instruction along the delay slot path, the no operation path and the arcs depends on the number of delay slots which the specific instruction utilizes. There is also disclosed a method for executing non-sequential instructions as performed by the state machine of the present invention.

10 Claims, 8 Drawing Sheets

METHOD AND APPARATUS FOR REDUCING CODE SIZE BY EXECUTING NO OPERATION INSTRUCTIONS THAT ARE NOT EXPLICITLY INCLUDED IN CODE USING PROGRAMMABLE DELAY SLOTS

CROSS REFERENCES TO RELATED APPLICATIONS

This application is related to U.S. Provisional Patent Application, Ser. No. 60/099,701 filed on Sep. 10, 1998, incorporated in its entirety by reference herein.

FIELD OF THE INVENTION

The present invention relates to processor performance generally and to the instruction set architecture (ISA) of such processors, in particular.

BACKGROUND OF THE INVENTION

A chip that includes either a general purpose processor or a Digital Signal Processor (DSP) contains different elements besides the processor. One of the most significant elements in terms of area of the chip used are the memories. These memories may be program memories, data memories, RAM, ROM or any other type of memory. The silicon wafer die size consumed by the chip influences the cost of the chip and it therefore should be minimized. Thus, any reduction in memory size will reduce the cost of the chip.

In a chip using any kind of processor, there is usually a program or code memory as part of the chip die. The program includes the instructions required to be fetched by the processor. The nature of the program, meaning the encoding of the instructions itself, is defined as the instruction set architecture (ISA) of the processor.

One common way to reduce the area of the program memory is in the encoding of the instructions. If each instruction can be made to consume less bits, the program memory will be smaller. For example, a processor whose instructions are encoded in a 32-bit word is likely to consume more program space than another processor that uses 16-bit instruction words.

Pipelines are extensively used in processor architectures. Each pipeline includes the stages, each of which takes one cycle to complete, to be performed by the processor in order to complete an instruction.

Reference is now made to FIG. 1 which illustrates an exemplary instruction pipeline which will be used for reference purposes throughout this patent application. The exemplary pipeline comprises six stages which each take up one clock cycle of the processor and add up to a total execution of an instruction. The exemplary pipeline comprises the following stages: Instruction Fetch (IF), Instruction Decode (ID), Address Generation (AG), Operand Fetch (OF), Execute (EX) and Flags & Conditions (FC). The architecture of the processor and its state machine together determine the pipeline and its depth.

Reference is now made to FIGS. 2A and 2B which illustrate a set of instructions which utilize the pipeline of FIG. 1. The instructions are denoted $I_1, I_2, I_3, I_4$ in FIG. 2A and denoted $I_1, I_2, I_3, I_{10}$ in FIG. 2B. Each instruction goes through the stages of the pipeline where each stage uses one clock cycle, as described hereinabove. As far as the flow of the code is concerned there are two types of instruction: sequential (seq) and non-sequential (non-seq). Examples of sequential instructions are "add" and "subtract". Non-sequential instructions are instructions which break the pipeline. The major reason for using them is to branch to a different memory location than the following one. The reason that this might be necessary is, for example, to perform a loop which repeats itself, to determine a condition and decide what instruction to take next or to accept an interrupt or any other non-sequential event.

Thus in FIGS. 2A and 2B, instructions $I_1$ and $I_2$ are sequential instructions whereas instruction $I_3$ is a non-sequential or branch instruction whose target, should a condition be met, is instruction $I_{10}$ (FIG. 2B). If the condition is not met, the pipeline proceeds with the next sequential instruction, $I_4$, which is shown in FIG. 2A.

The non-sequential instructions usually involve a penalty for breaking the pipeline. There are two main reasons for this penalty. The first is that the non-sequential instruction has to be decoded before the target instruction can be fetched. Thus, the execution of the target instruction cannot begin until after the decoding stage of the non-sequential instruction has been completed. Sometimes the address of the target instruction has to be calculated prior to fetching it, further delaying the beginning of execution of the target instruction.

Another penalty arises when the non-sequential instruction is conditional. In this case, the execution of the non-sequential instruction has to be halted until the condition is checked and a true/false indication is ready.

FIG. 2B shows the flow of a taken branch (i.e. a conditional branch in which the condition was met) in the pipeline where the target instruction is $I_{10}$. In this case, the penalty of the branch instruction is 4 cycles because, as was mentioned above, the true/false condition is only known at a late stage. The true/false condition is known at the EX (or execute) stage of the $I_3$ branch instruction and therefore the IF (instruction fetch) stage of target instruction $I_{10}$ must wait for four cycles (cycles 4,5,6,7) in order to start. Thus, the branch instruction takes 5 cycles to execute.

When the condition is found to be false and the branch is not taken, this branch instruction will only take four cycles, as shown in FIG. 2A. This is illustrated by the $I_4$ pipeline, $I_4$ being the instruction following the branch instruction $I_3$, as opposed to the target instruction $I_{10}$ (FIG. 2B). This causes a penalty of three cycles (cycles 4, 5 and 6) over a single cycle instruction. The lower execution time in this case is due to the early instruction fetch mechanism, which starts fetching the next sequential instruction $I_4$ in the cycle before the condition is known (cycle 7). The pipeline of this instruction is then halted if the assumed condition does not, in fact, occur.

The branch instruction may be, for example the machine code "branch, new, neq", where "branch" indicates a branch instruction, "new" indicates the target instruction and "neq" is the condition for taking this branch, "new" and "neq" each respectively constitute a field in the branch instruction.

The penalty of a certain instruction is calculated by counting the number of cycles between its ID stage and the ID stage of the next instruction. In case of a single-cycle instruction, there is no penalty since the ID stage of the next instruction immediately follows. Since in a non-sequential instruction this is not the case, the intermediate cycles are termed "wasted cycles".

For a branch instruction, at least three cycles are wasted (cycles 4, 5, 6 in FIGS. 2A and 2B marked with "wasted IF"), irrespective of whether or not the branch is taken.

Reference is now made to FIGS. 3A and 3B which illustrate a common way to eliminate these wasted cycles by using delay-slot instructions. FIG. 3A illustrates the case where the branch instruction is not taken and FIG. 3B where the branch instruction is taken. Similar items to previous figures have similar reference numerals and will not be described further. Delay slot instructions are instructions which use the wasted cycles. They appear after the branch instruction, but will be executed before the branch instruction is executed. Any sequential instruction can be used as a delay slot instruction.

Thus, instructions DS1, DS2 and DS3 demonstrate three delay slot instructions added to the pipeline of FIGS. 2A and 2B. These delay slot instructions are executed in the spaces corresponding to the "wasted IF" cycle (cycles 4, 5, 6). The following code (written in machine code) demonstrates the concept of these instructions:

| | |
|---|---|
| comp a0, a1 | ;the branch condition instruction |
| branch next,neq | ;branch to address 'next' if a0 ≠ a1 (neq = not equal) |
| →move r0, r1 | ;these 3 instructions will be executed prior to the |
| | ;branch instruction, even though they appear after it. |
| | ;They don't affect the decision whether to take the |
| | ;branch or not. |
| →add r1, a0 | |
| →nop | |

Using the suggested pipeline of FIG. 1 and the pipeline flow of the branch instructions, a maximum of three delay slot instructions can be supported. These will fit into the three wasted cycles ("wasted IF") in the branch instruction as mentioned above in respect of FIGS. 2A and 2B. The three instructions marked with a→are the three delay slot instructions. The nop instruction stands for a "No Operation" which means that this instruction does nothing in that delay slot. The programmer must use a nop instruction when he cannot utilize the third delay slot as in the present example. In general, a nop instruction must be used to fill delay slots that cannot be utilized. Instruction DS3 shown on FIGS. 3A and 3B is the third delay slot instruction, which will be a nop instruction in this case.

Even though the delay-slot instructions are executed prior to the branch instruction, they do not affect the decision whether to take the branch or not. Only instructions that appear before the branch instruction may affect this decision (in the present example, the "comp" instruction and any other instructions that may appear before it).

Utilizing this method, the penalty for a branch instruction may reduce to 0 if all delay-slot instructions are used and the branch is not taken. This situation is shown in FIG. 3A which illustrates the scenario when the branch is not taken. FIG. 3B illustrates the case when the branch is taken. It should be noted that when the branch is taken, as shown by the target instruction TI ($I_{10}$), there is still a "wasted IF" even if the available delay slots have been used.

The following table summarizes the possible penalties of a branch instruction, utilizing delay-slots:

| | Penalty on branch instruction | |
|---|---|---|
| Delay-slots used | Branch not taken | Branch taken |
| 0 | 3 | 4 |
| 1 | 2 | 3 |
| 2 | 1 | 2 |
| 3 | 0 | 1 |

With reference to the processor architecture, reference is now made to FIG. 4 which illustrates the operations of the state machine of the processor when performing the pipelines of FIGS. 3A and 3B. The state machine manages the ID stage of different instructions while counting down the number of cycles left for the particular instruction currently being executed. Hence, for single cycle instructions there are no "cycles left" between the ID stages of consecutive instructions. However, for branch instructions, the number of "cycles left" corresponds to the delay, between the ID stage of the branch instruction $I_3$ (FIGS. 2A and 2B) and the ID stage of the target instruction (TI), $I_{10}$ (FIG. 2B).

State '0' is the ID stage in which all sequential instructions are executed. Since this state machine does not implement any other multi-cycle instructions except for the branch instruction, the transition from state '0' to state '4' (ID stage of the first delay slot) is enabled only due to a branch instruction as shown in FIGS. 3A–3B. State '3' is the ID stage of the second delay slot (DS2 in FIGS. 3A–3B). During state '2' (EX stage of the branch pipeline, I3, and ID stage of the third delay slot DS3), the true/false indication is ready, hence, a decision is made whether to take the branch (proceed to state '1' which is the FC stage of the branch pipeline, I3 (FIG. 3B)) or not (proceed to state '0', the ID stage of the next sequential instruction, I4 (FIG. 3A)).

The more delay slots a programmer uses (not by filling with nop instructions), the less penalty he will have on the non-sequential instruction. However, fully utilizing the delay slots is a very complicated task which requires careful programming. As described hereinabove it is sometimes impossible to utilize all the delay slots available (hence the nop instruction above) due to a number of factors including inter-dependencies between instructions. Clearly, in such a case, when not all delay-slots can be utilized, the penalty for the non-sequential instruction is that the code increases in size since the programmer is obliged to write nop instructions in the delay-slots he is not able to utilize.

These nop instructions are part of the code, hence they are encoded into the program memory and consume code size.

SUMMARY OF THE INVENTION

An object of the present invention is to reduce the size of code used in a processor.

A further object of the present invention is to provide means for indicating in a condensed instruction the number of delay slots used.

There is thus provided in accordance with a preferred embodiment of the present invention a method for reducing the size of code for processors. The method is made up of a step which is to provide each non-sequential instruction i with an option defining a number M of delay slots to be used out of Ni delay slots available for that instruction. M can vary from 0 to Ni.

There is further provided a method for executing non-sequential instructions. The method is made up of receiving a field from a non-sequential instruction and executing the non-sequential instruction with delay slot instructions and no operation instructions. The field contains the number M of delay slots to be utilized out of N delay slots available for the instruction. While executing the non-sequential instruction M delay slot instructions and (N–M) no operation instructions are also executed.

Further, there is provided a non-sequential instruction having a plurality of fields one of which is a delay slot field. The delay slot field indicates the number, M out of N available delay slots to be utilized by a state machine for the instruction when the instruction is executed. Furthermore, the state machine performs a no operation instruction for the (N–M) non-utilized delay slots.

There is further provided a state machine for executing sequential and non-sequential instructions. The non-sequential instructions have delay slots associated with them. The state machine is made up of a number of nodes representing states and a number of arcs connecting the nodes. The arcs and nodes are connected to form a first path and a second path. The first path represents the path where no delay slots are used and the second path represents the path where all available delay slots are used. Some of the arcs connect between the first and second paths.

Furthermore, there is provided a state machine for executing sequential and non-sequential instructions. The non-sequential instructions have delay slots associated with them. The state machine is made up of a delay slot path and a no operation path, both made up of nodes with arcs connecting between them. There are arcs between the nodes of the delay slot path and the nodes of the no operation path. The number of nodes in the no operation path is equivalent to the number of available delay slots. The path taken for a specific instruction along the delay slot path, the no operation path and the arcs depends on the number of delay slots which the specific instruction utilizes. Further, the no operation path ends at a decision node.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 6:
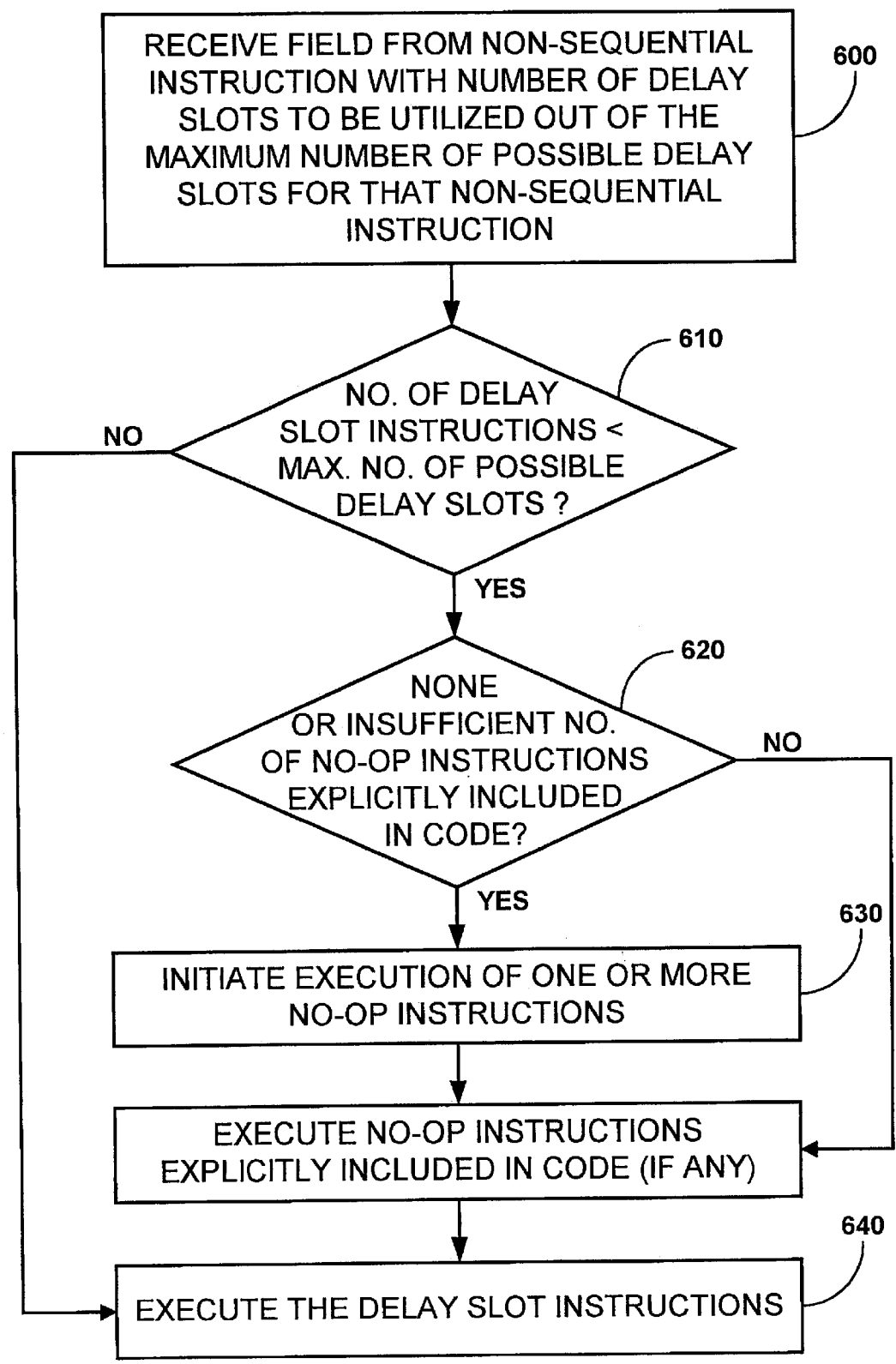
FIG. 6 is a simplified flowchart illustration of a method in accordance with some embodiments of the present invention.
Figure 7:
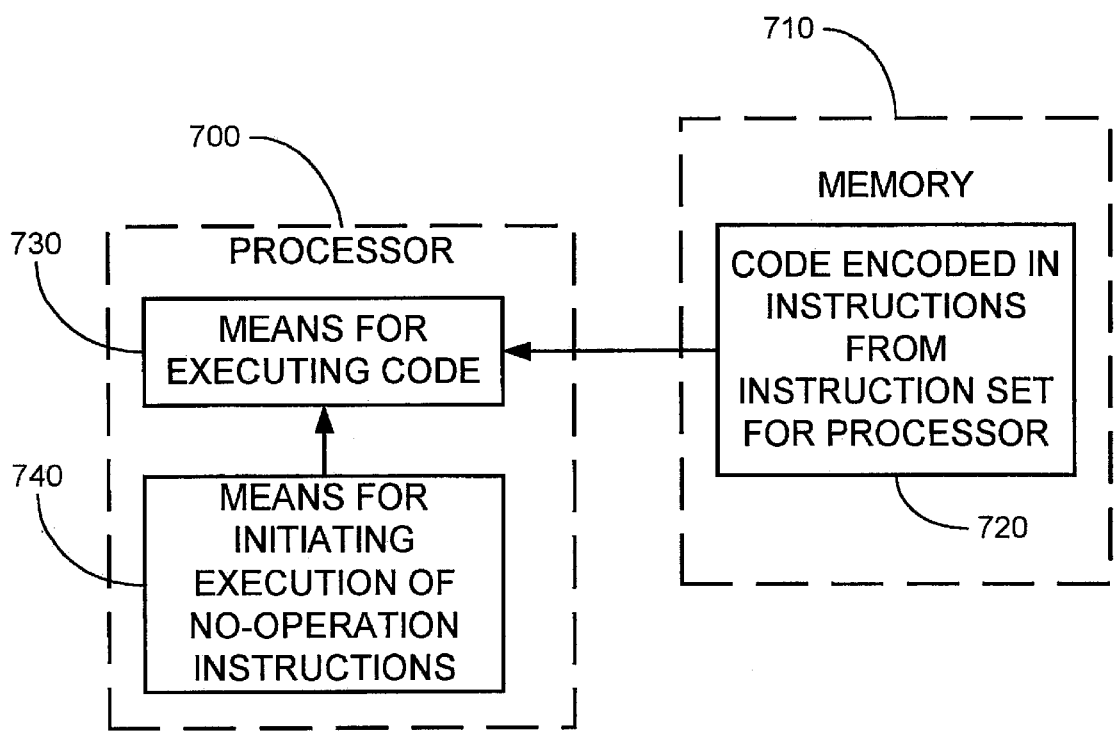
FIG. 7 is a schematic block diagram illustration of a processor coupled to a memory in accordance with some embodiments of the present invention.

Reference is now made to FIG. 6, which is a simplified flowchart illustration of a method in accordance with some embodiments of the present invention, and to FIG. 7, which is a schematic block diagram illustration of a processor coupled to a memory in accordance with some embodiments of the present invention.

The present invention is a method to reduce the code size, while maintaining the above-mentioned delay-slot mechanism, which may significantly speed up the execution time of non-sequential instructions. Good code compactness is achieved by using a special mechanism managed by the programmer. This mechanism is related to all non-sequential instructions.

In order to achieve this goal, the programmer is allowed to determine, within the non-sequential instruction, the number of delay slots he wants to use (block 600). In accordance with the exemplary above-mentioned implementation of a branch instruction, up to 3 delay-slots are available. The programmer may therefore use 0, 1, 2 or 3 delay-slots, in accordance with the circumstances.

In this way, the penalty in terms of code size due to the non-use of a delay slot is eliminated. Code compactness is achieved by letting the programmer determine within the non-sequential instruction, the number of delay-slots to be utilized, while the penalty of the non-sequential instruction in terms of execution time, depends on the ability of the programmer to use as many delay-slots as he can.

By way of example, the above-mentioned code which included a nop instruction as the third delay-slot, will look like the following in the present invention:

comp a0, a1; the branch condition instruction
branch, ds2, next, neq; branch to address 'next' is a0≠a1 (neq=not equal).
→move r0, r1; these 2 instructions are the delay-slot instructions,
→add r1, a0;

The ds2 switch in the branch instruction indicates that this branch instruction was using 2 delay-slot instructions. These are the 2 instructions following the branch instruction (marked with a→). The nop instruction in the previous code is spared (blocks 610 and 620), and so is that additional program memory it consumes. However, the processor 700 internally executes this nop instruction (block 630), even though it does not appear in the code 720. This is described further in relation to the state machine hereinbelow. In this way, the programmer indicates to the processor 700 his ability to utilize two delay slots, meaning that the processor has to execute the remaining nop by itself (block 630).

Using the above-mentioned pipeline and implementation of a branch instruction, the user may use either one of the following switches in the branch instruction: ds0, ds1, ds2, ds3. This of course affects the instruction set and its encoding, since the non-sequential instruction has an additional field—the delay-slot field.

Figure 4:
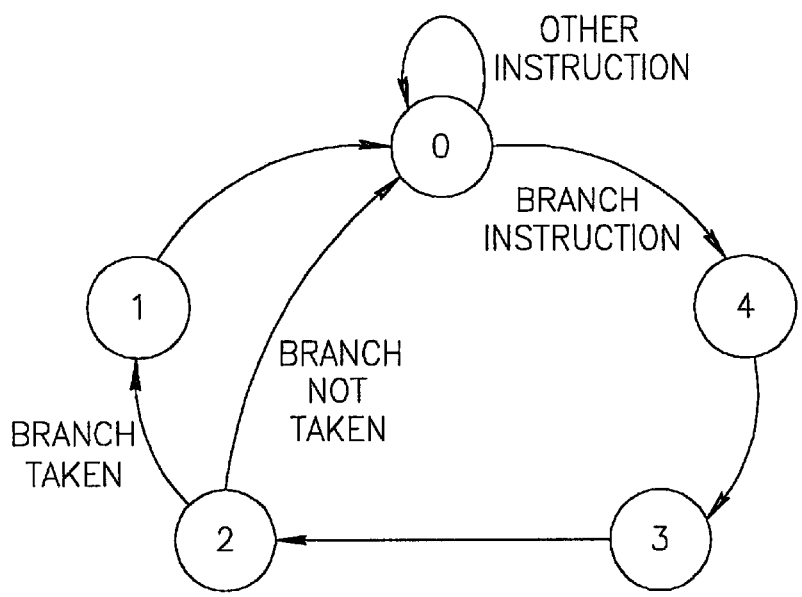
FIG. 4 is a schematic illustration of the state machine in accordance with the prior art.
Figure 5:
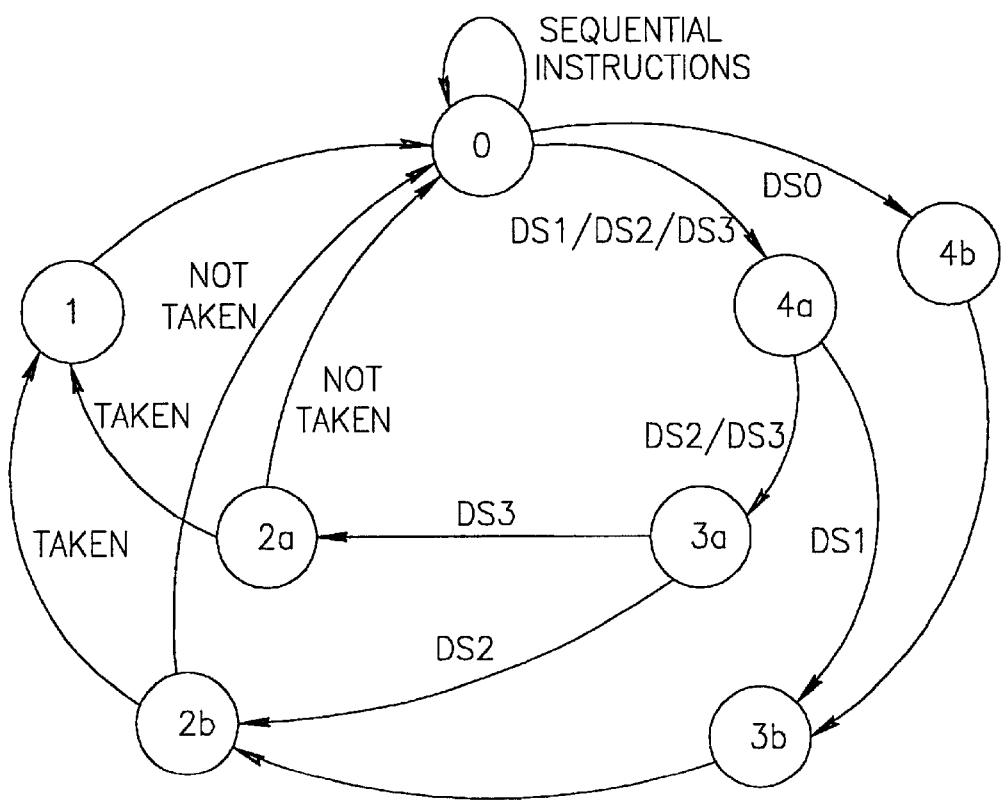
FIG. 5 is a schematic illustration of the state machine in accordance with a preferred embodiment of the present invention.

In order to support this type of operation, the state machine of the processor has to be modified. Reference is now made to FIG. 5, which illustrates the modified state machine; states 4, 3 and 2 from the previously presented state machine (FIG. 4) have been changed. They each now consist of two possible states. Thus, states '4b' and '4a', '3b' and '3a', '2b' and '2a' replaces states 4, 3 and 2 respectively.

The states denoted with "a" are states in which the processor 700 executes delay slot instructions (block 640) fetched from the program memory 710. The states denoted with "b" are states in which the processor 700 internally executes "nop" instructions, (hereinafter "internal nop") meaning that it (740) drives itself (730) with such an instruction, as if it was fetched from the program memory 710.

Figure 3A:
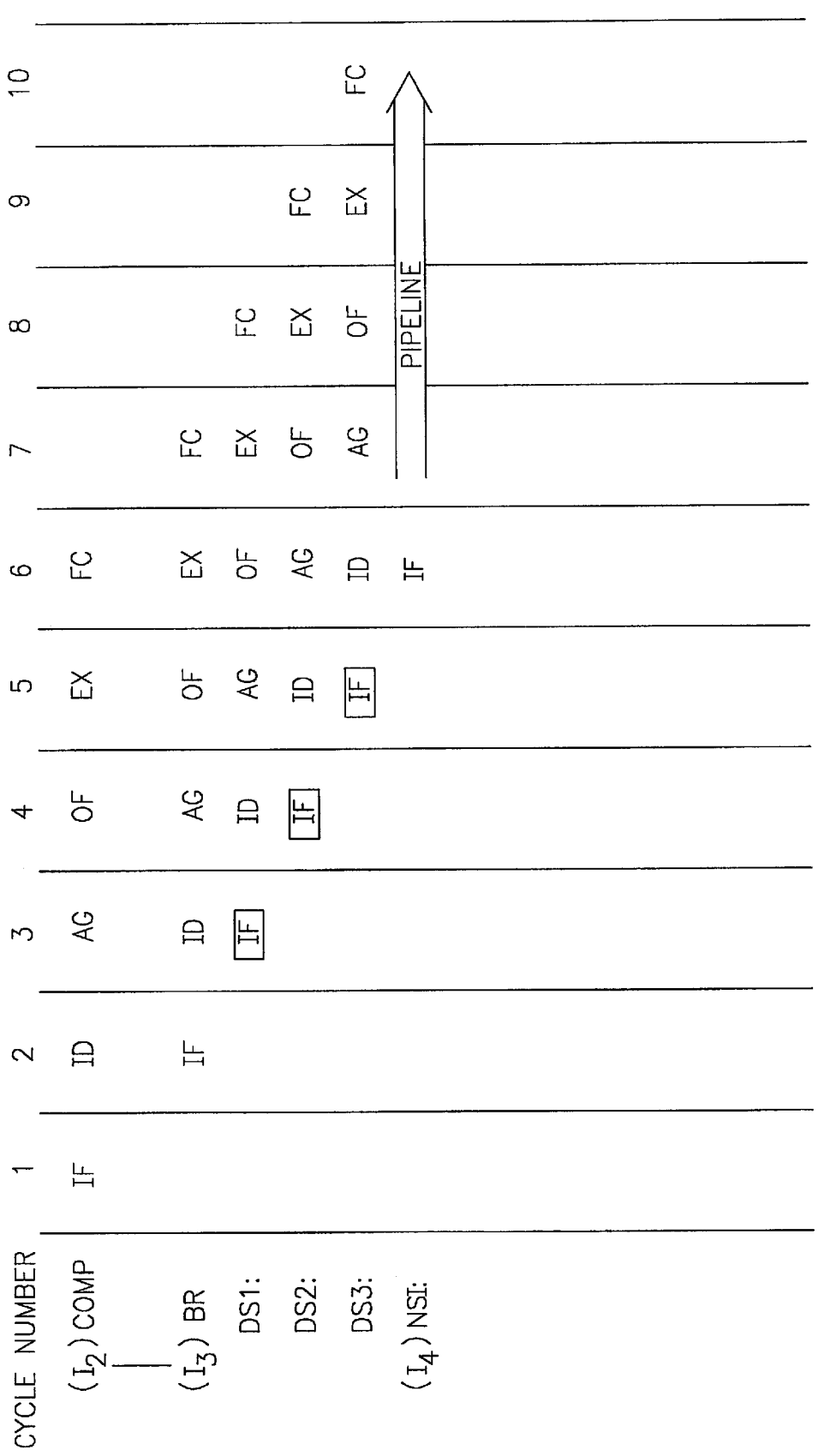
FIGS. 3A and 3B are schematic illustrations of the set of instructions in accordance with FIGS. 2A–2B which utilize delay slot instructions in accordance with the prior art.
Figure 3B:
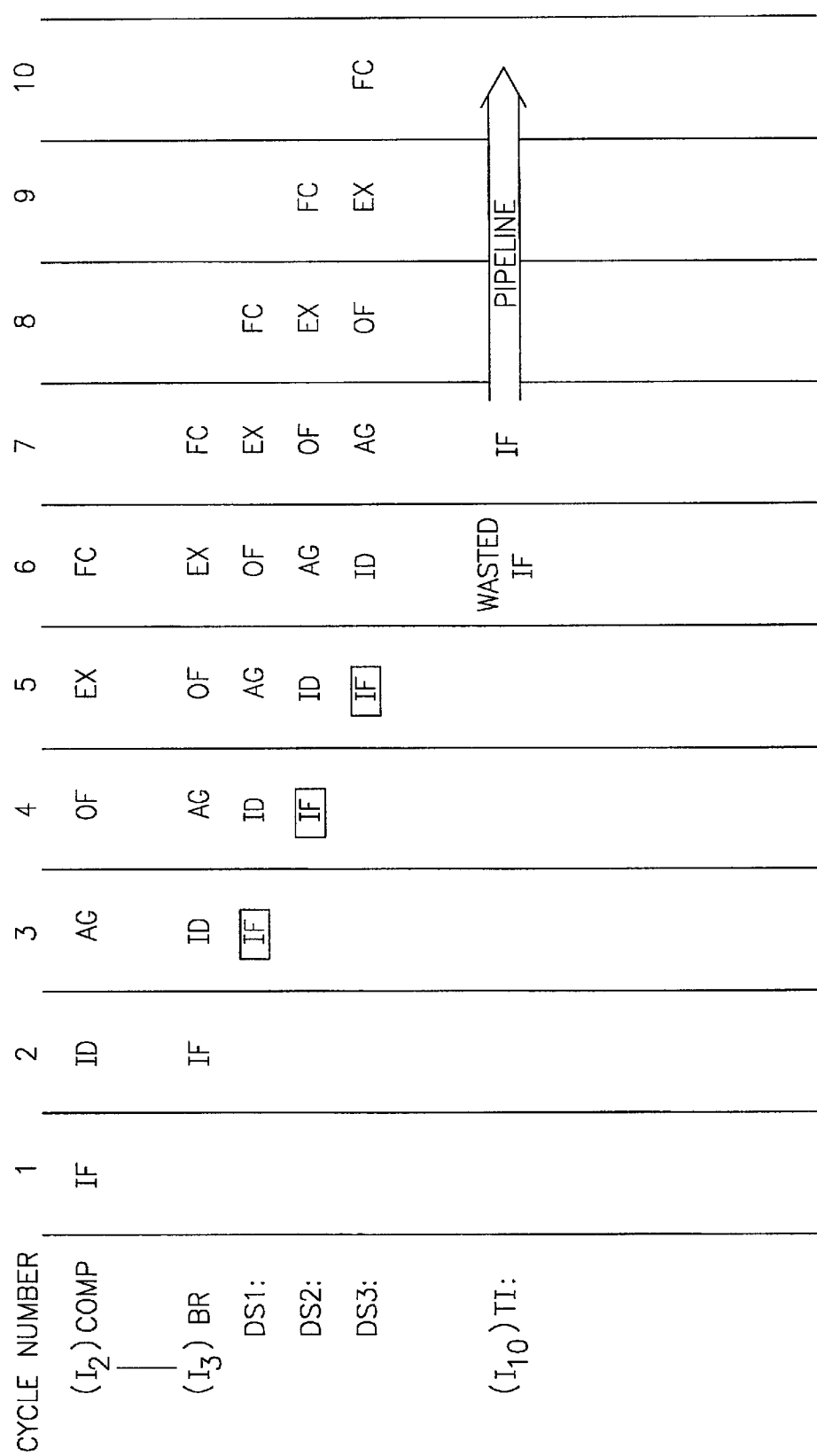

States '4a' and '4b' are processed during cycle 4 in FIGS. 3A–3B. This cycle is the ID stage of the first delay slot or the ID stage of the first internal nop instruction. Likewise, states '3a' and '3b' are processed during cycle 5 in FIGS. 3A–3B. States '2a' and '2b' are processed during cycle 6 in FIGS. 3A–3B and state '1' is processed during cycle 7 in FIG. 3B, corresponding to a taken branch.

Similar to the previously presented state machine, state '0' is the ID stage in which all single instructions are executed. The transition from that state to state '4a' is enabled when a branch instruction that uses any number of delay-slots (using one of the following fields—ds1, ds2, ds3) is executed. The transition from state '0' to state '4b' is enabled when a branch instruction that does not use any delay-slots (using the ds0 field) is executed. In the same manner, the transition from state '4a' is enabled when the branch instruction uses either 2 or 3 delay slots (using ds2 or ds3 fields). The transition from state '4a' to state '3b' is enabled when only 1 delay slot is used (using the ds1 field).

The transitions from states '2a' and '2b' to state '1' and then to state '0' are determined, as described hereinabove, according to the decision whether to take the branch (continue with state '1') (FIG. 3B) or not (proceed with the next sequential instruction and more to state '0') (FIG. 3A).

As an example, the previously described code that uses 2 delay slots will go through this state machine in the following flow:

1. state '0' (processed during cycle 3 in FIGS. 3A–3B) which is the ID stage of the branch instruction, $I_3$,
2. state '4a' (processed during cycle 4 in FIGS. 3A–3B) which is the ID stage of the first delay slot DS1,
3. state '3a' (processed during cycle 5 in FIG. 3) which is the ID stage of the second delay slot DS2,
4. state '2b' (processed during cycle 6 in FIG. 3) which is the ID stage of the internal nop,
5. state '1' in case the branch is taken (processed during cycle 7 in FIG. 3B) or state '0' in case the branch is not taken (processed during cycle 7 in FIG. 3A).

It should be noted that the sequence of the flow of the delay slots (block 640) and the internal nop (block 630) in the case of a non-sequential instruction, may be varied. Thus, any combination of internal nops and utilized delay slots may be used, in any order. For example, the previously described flow can begin with the internal nop (state '4b' of FIG. 5) and continue with two delay slots (states '3a' and '2a'). The exemplary state machine would be modified accordingly.

Figure 1:
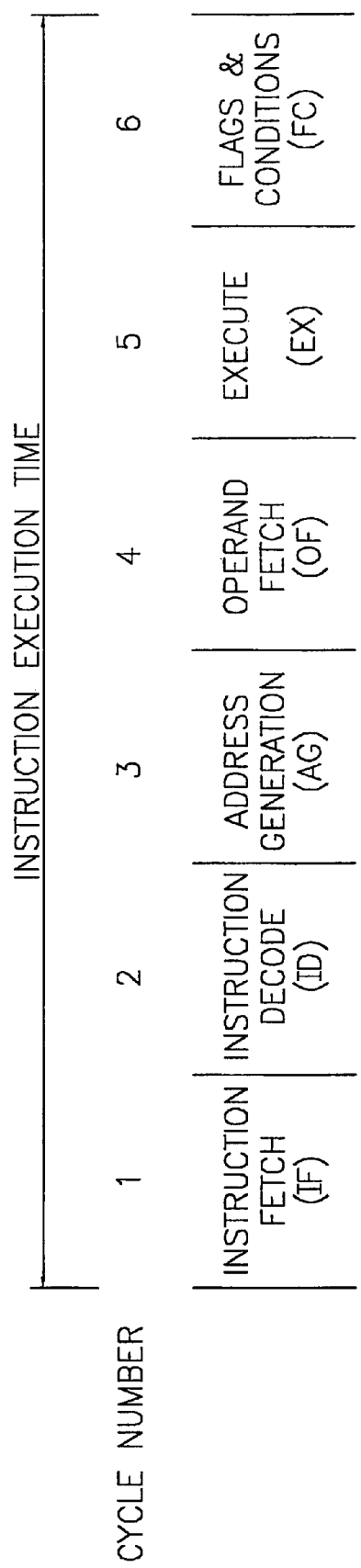
FIG. 1 is a schematic illustration of a prior art instruction pipeline.
Figure 2A:
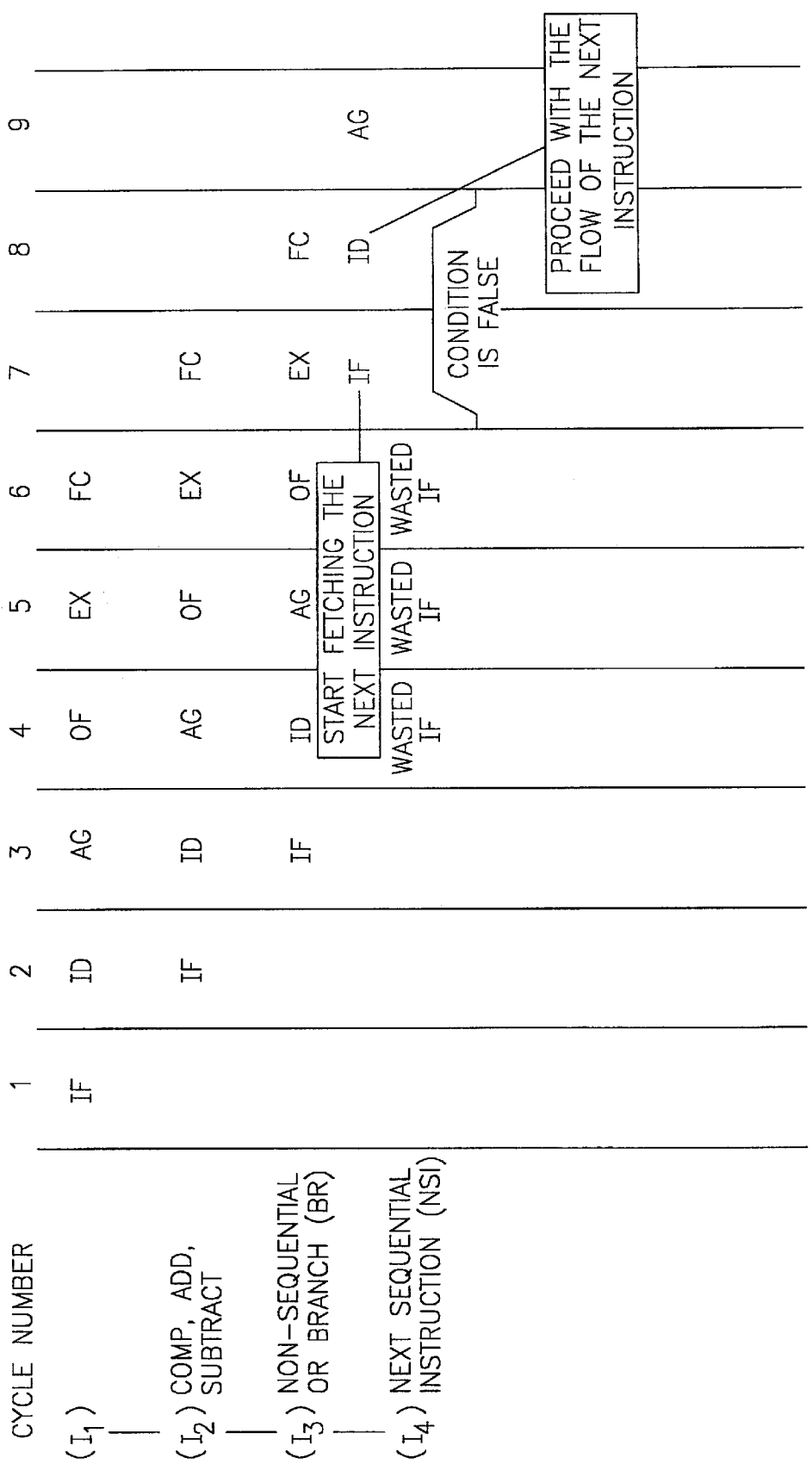
FIGS. 2A–2B are schematic illustrations of a set of instructions and their flow in the pipeline in accordance with the prior art, where 2A illustrates the flow of a not taken branch and 2B illustrates the flow of a taken branch.
Figure 2B:
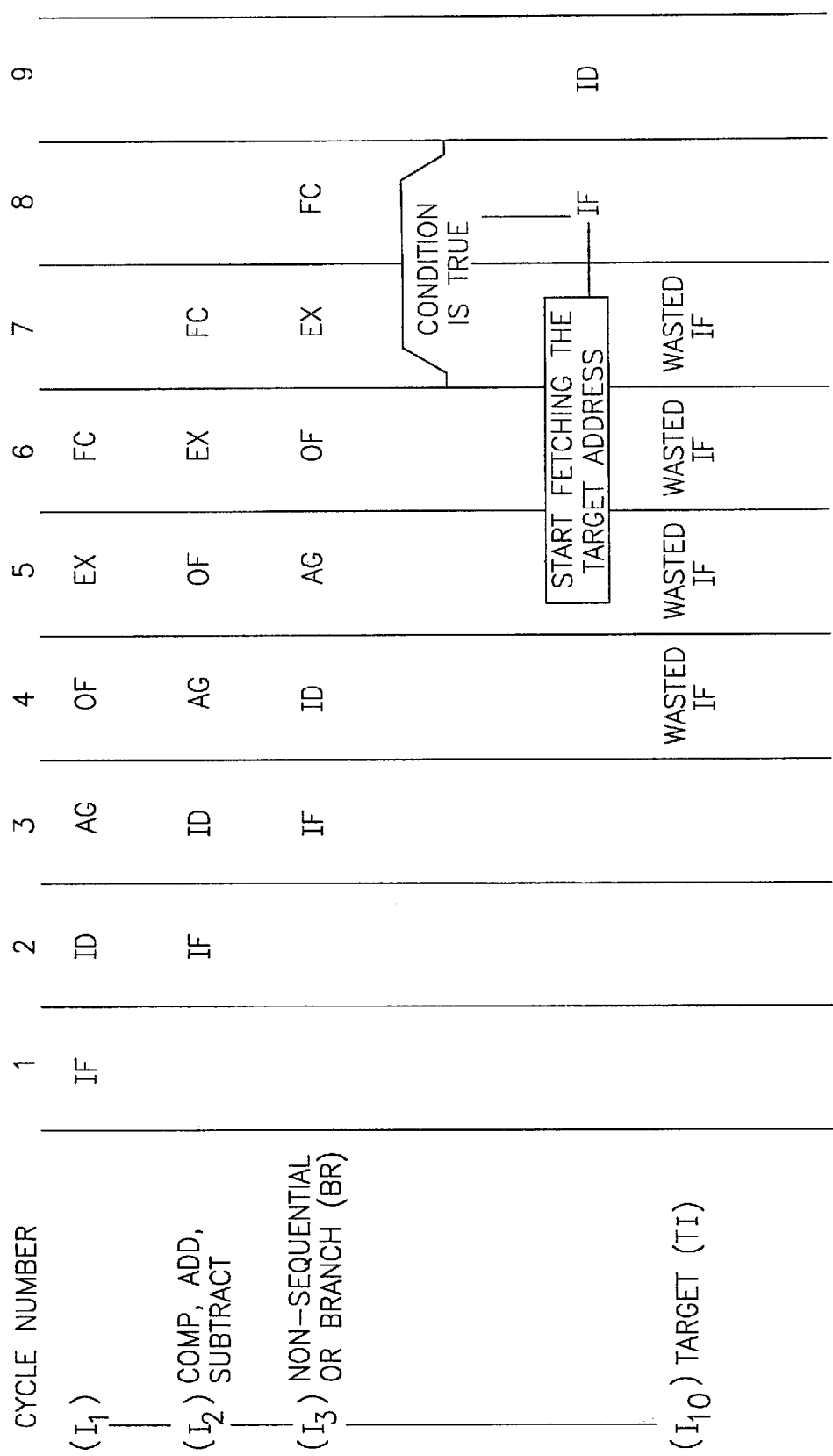

It should be further noted that not all non-sequential instructions can support the same amount of delay-slots. Thus, the exemplary state machine shown will vary for different non-sequential instructions. For example, a loop instruction that performs a repetition of a single or a block of instructions, can use up to two delay-slot instructions using this type of pipeline. This means that the loop instruction can only use either one of the following switches ds0, ds1 or ds2. Other examples of instructions that can use programmable delay-slots are call-subroutine, return-from-subroutine and trap-request which can use up to 2, 3 and 1 delay-slots respectively using this type of pipeline (as illustrated in FIG. 1).

It will be appreciated, by persons skilled in the art, that the present invention is not limited by what has been particularly shown and described hereinabove. Rather the scope of the invention is defined by the claims that follow:

What is claimed is:

1. A method for executing non-sequential instructions, the method comprising:
   receiving a field from a non-sequential instruction encoded in code for a processor wherein said field contains the number of delay slots to be utilized out of delay slots available for that instruction; and
   prior to executing said non-sequential instruction:
      executing a number of delay slot instructions equal to said number of delay slots contained in said field; and
      executing one or more no operation instructions when said number of delay slot instructions is less than the maximum number of possible delay slots for said non-sequential instruction, even if said code does not explicitly include said no operation instructions following said non-sequential instruction.

2. A processor to implement a state machine for executing sequential and non-sequential instructions, said non-sequential instructions having delay slots associated therewith, the state machine comprising:
   a plurality of nodes representing states; and
   a plurality of arcs connecting said nodes, wherein said arcs and nodes are connected to form a first path and a second path, wherein said first path represents the path where no delay slots are used and said second path represents the path where all available delay slots are used, and wherein some of said arcs connect between said first and said second paths.

3. A processor to implement a state machine for executing sequential and non-sequential instructions, said non-sequential instructions having delay slots associated therewith, the state machine comprising:
   a delay slot path;
   a no operation path;
   said paths having nodes and arcs connecting said nodes wherein the number of nodes in said no operation path is equivalent to the number of available delay slots; and
   arcs between said nodes of said delay slot path and said nodes of said no operation path;
   wherein the path taken for a specific instruction along said delay slot path, said no operation path and said arcs depends on the number of delay slots which said specific instruction utilizes.

4. The processor of claim 3 wherein said no operation path ends at a decision node.

5. A method for reducing the size of code for a processor, the method comprising:
   providing an instruction set for the processor comprising a non-sequential instruction whose format includes a field defining the number of delay slots to be filled with sequential instructions other than no-operation instructions; and
   providing in the processor means for initiating execution of one or more no-operation instructions prior to execution of the non-sequential instruction when the number of delay slots specified in the field in the code is less than the maximum number of possible delay slots for the non-sequential instruction and the code does not explicitly include any or a sufficient number of no-operation instructions following the non-sequential instruction.

6. A method comprising:
   prior to execution of a non-sequential instruction:
      executing one or more delay slot instructions explicitly included in code for a processor following the non-sequential instruction; and
      executing one or more no-operation instructions when the number of the delay slot instructions is less than the maximum number of possible delay slots for the non-sequential instruction even if the code does not explicitly include no-operation instructions following the non-sequential instruction.

7. A method comprising:
   providing in a processor means for initiating execution of one or more no-operation instructions prior to execution of a non-sequential instruction when the number of delay slot instructions following the non-sequential instruction in code for the processor is less than the maximum number of possible delay slots for the non-sequential instruction and the code does not explicitly include any or a sufficient number of no-operation instructions following the non-sequential instruction.

8. A processor comprising:

means for executing code comprising instructions of an instruction set, the instruction set comprising a non-sequential instruction whose format includes a field defining the number of delay slots to be filled with sequential instructions other than no-operation instructions; and means for initiating execution of one or more no-operation instructions prior to execution of the non-sequential instruction when the number of delay slots specified in the field in the code is less than the maximum number of possible delay slots for the non-sequential instruction and the code does not explicitly include any or a sufficient number of no-operation instructions following the non-sequential instruction.

9. A processor comprising:

means for executing, prior to execution of a non-sequential instruction, one or more delay slot instructions explicitly following the non-sequential instruction in code for said processor; and means for executing, prior to execution of a non-sequential instruction, one or more no-operation instructions when the number of the delay slot instructions is less than the maximum number of possible delay slots for the non-sequential instruction even if the code does not explicitly include no-operation instructions following the non-sequential instruction.

10. A processor comprising:

means for executing, prior to execution of a non-sequential instruction, one or more delay slot instructions explicitly following the non-sequential instruction in code for said processor; and means for initiating execution of one or more no-operation instructions prior to execution of the non-sequential instruction when the number of said delay slot instructions is less than the maximum number of possible delay slots for the non-sequential instruction and the code does not explicitly include any or a sufficient number of no-operation instructions following the non-sequential instruction.

* * * * *